Dec. 19, 1939.     J. H. STRONG     2,183,594
PARACHUTE TRAINING AND AMUSEMENT DEVICE
Filed Feb. 17, 1938     3 Sheets-Sheet 1

Inventor
James H. Strong,
By Emery, Booth, Holcombe & Miller
Attorneys.

Dec. 19, 1939.   J. H. STRONG   2,183,594
PARACHUTE TRAINING AND AMUSEMENT DEVICE
Filed Feb. 17, 1938   3 Sheets-Sheet 2
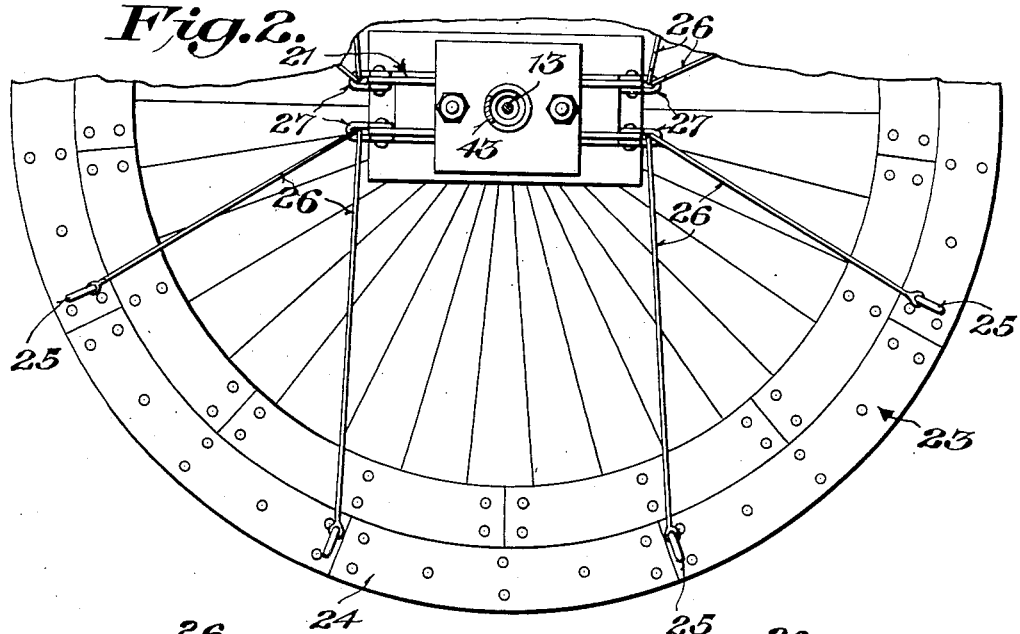
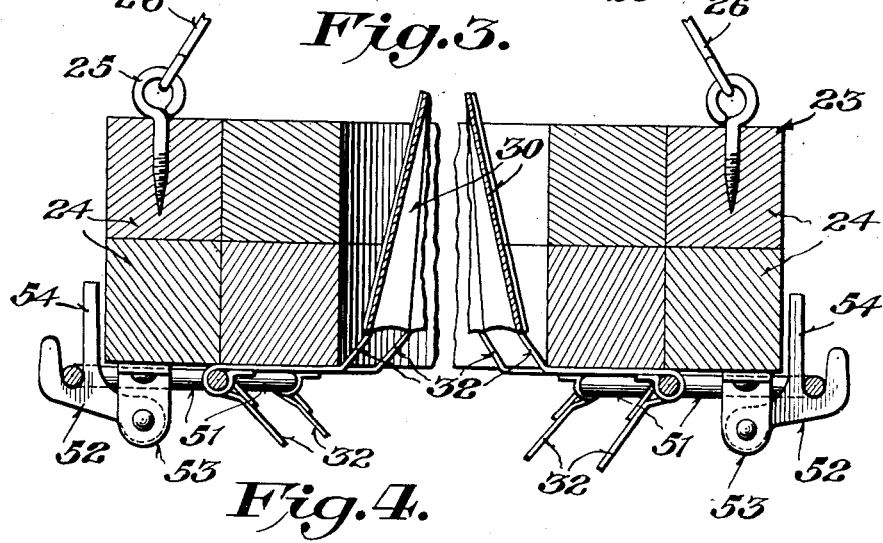
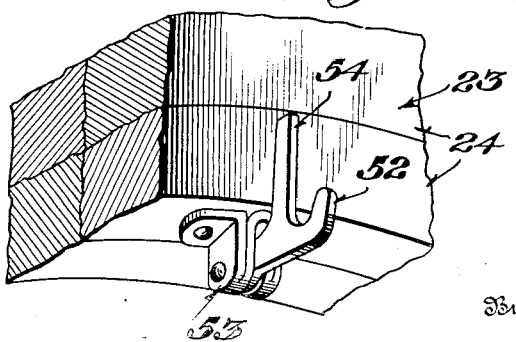
Inventor
James H. Strong,
By Emery Booth Holcombe Mueller
Attorneys

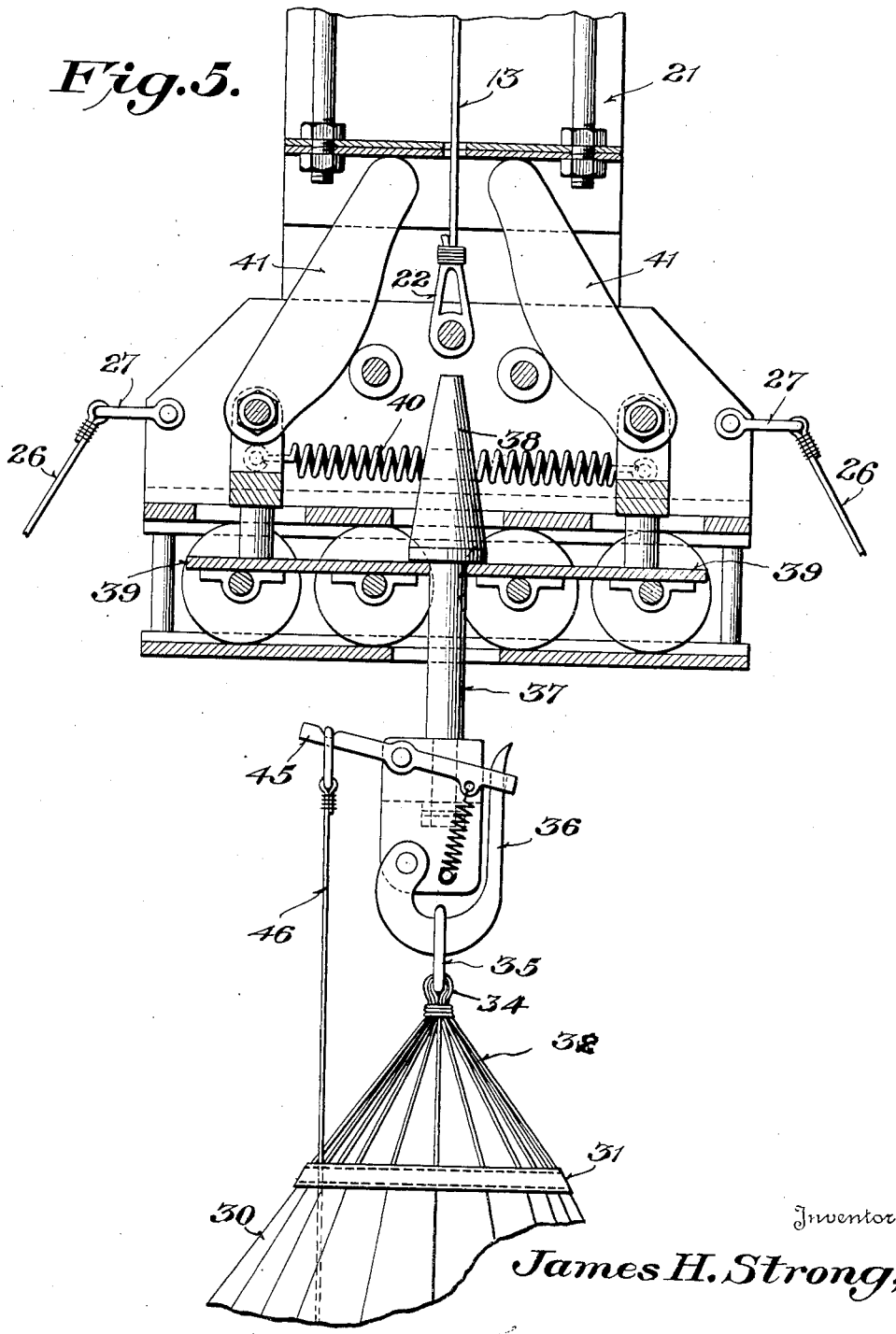

Patented Dec. 19, 1939

2,183,594

UNITED STATES PATENT OFFICE 2,183,594

PARACHUTE TRAINING AND AMUSEMENT DEVICE

James H. Strong, Hightstown, N. J.

Application February 17, 1938, Serial No. 191,063

20 Claims. (Cl. 35—12)

This invention relates to mechanical devices for giving instruction to military and civilian aviators and others in parachute jumping, and aims to enable those desiring or required to use parachutes to familiarize themselves with the conditions under which parachutes are used for safe jumping from great heights.

A further aim is to provide suitable means for training attendants and testing safeguards in the use of amusement devices of the type consisting of a tower and a parachute arranged to be dropped therefrom while carrying one or more passengers.

With these and kindred aims in view, the invention comprises improvements in the parachute construction and hoisting and releasing mechanism for insuring reliability of functioning of the apparatus and safeguarding the attendants and passengers or others using the apparatus.

One improvement pertains to the retaining means for releasably securing the parachute canopy to a spreading device; another pertains to the hoisting means and combined automatic and manual releasing device for permitting the parachute to drop at a predetermined elevation or at any elevation desired; another pertains to the arrangement for suspending the spreading device from the housing device; another pertains to the means for insuring release of the parachute at the upper end of its hoisting travel to avoid over hoisting; another pertains to the parachute shroud and skirt construction for providing strength without unnecessary weight; and another pertains to the protection of the parachute from lateral wind pressure and gusts or eddy currents during its hoisting travel and until released.

Other objects and advantages of the invention appear in connection with the following description of the illustrative apparatus shown in the accompanying drawings, wherein Fig. 1 is a side elevation of the top and bottom portions of the tower and hoisting means and part side view and part cross-section of the releasing means and parachute spreading means, the parachute and body harness, shown in side elevation, making up the instruction apparatus; and Fig. 2 is a half plan view of the parachute suspending and spreading means, Figs. 1 and 2 not being drawn to scale;

Fig. 3 is a cross-sectional large scale view of the spreading ring showing the latch members in side elevation, parts of the parachute canopy and shrouds being shown approximately in their normal position during the ascent of the parachute;

Fig. 4 is a perspective view of a latch member in its normal position ready for hooking on the parachute, Figs. 3 and 4 being drawn to the same scale; and Fig. 5 is a detail side elevation of the automatic suspending and releasing device for the peak of the parachute, partly in section, drawn to a varying scale larger than Fig. 1.

Figure 1:
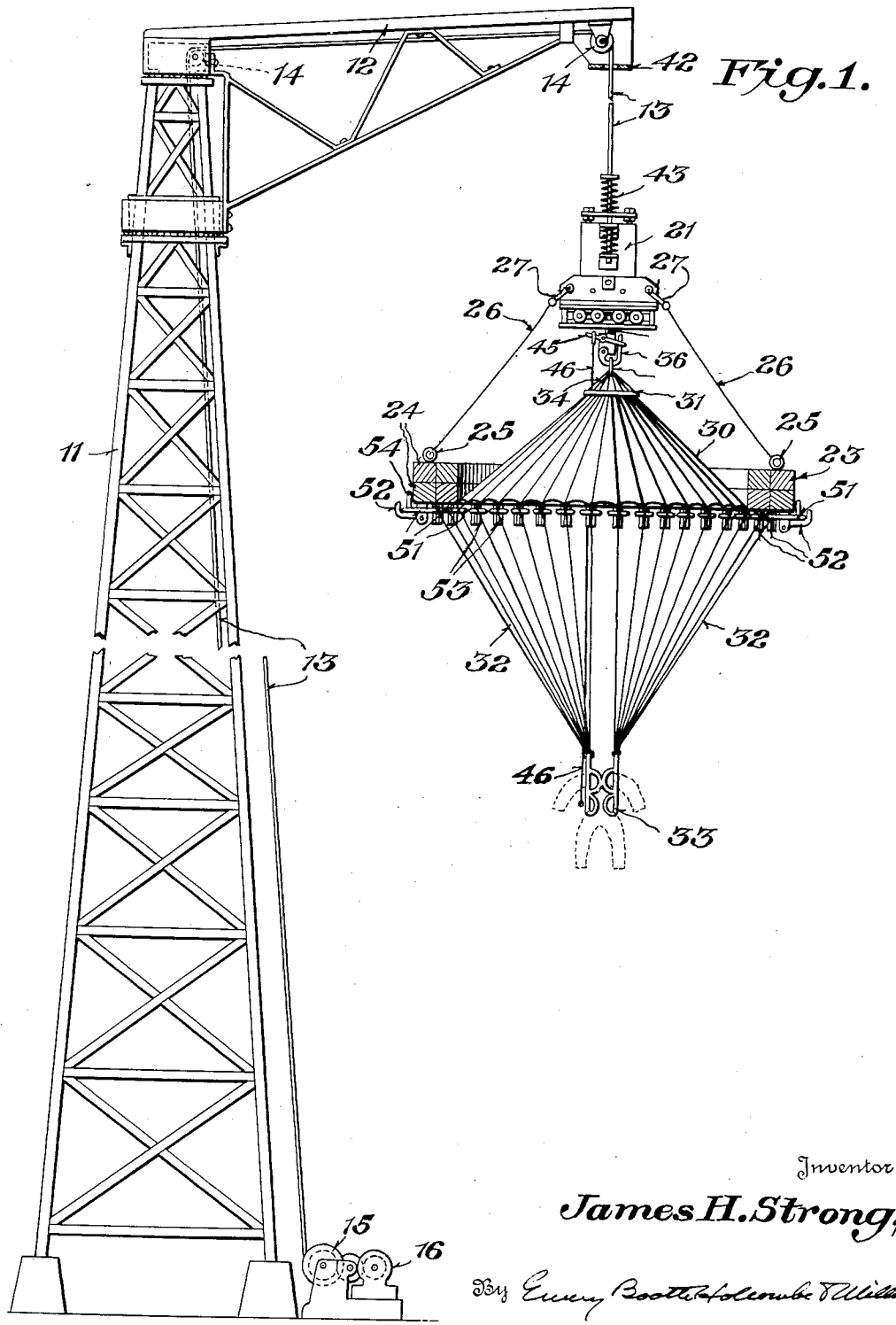

The tower 11 may be constructed of steel or timber and guyed or otherwise braced against lateral wind pressure and forces tending to overturn it. The tower should be from one hundred to one hundred and fifty feet high for effective use of the apparatus, but these heights are not limiting, and the details of construction and materials used are such as to meet the requirements of location and use.

At the top of the tower is a lateral platform or boom 12 strong enough to hold the weight of the hoisting cable 13 and the apparatus suspended therefrom, and preferably mounted on circular tracks or bearings 19 to permit it to turn through 360° and capable of being rotated 360° in a horizontal plane. The cable may advantageously run over a pulley 14 or series of pulleys mounted on the boom and extends to the ground, where its end is wound on a drum 15 or other power driven winding device operated by a suitable motor 16 under the control of a ground attendant.

The upper or free end of the cable 13 is provided with a hoisting head and parachute releasing device 21, which is secured to the cable by a clevis or eyes 22. The parachute extending and spreading ring 23 is freely supported by the hoisting head, as shown in Figs. 1 and 2. This spreading ring is preferably constructed of laminated wood sections 24 to give it strength and rigidity without much weight, and is provided with eyes 25 which are screwed into it at spaced points for the bridles 26 which suspend it loosely from clevises 27 pinned to the hoisting head at suitable points for maintaining its level. The hoisting head and automatic engaging and releasing mechanism for lifting and dropping the parachute are similar to the subject-matter of my pending application Ser. No. 110,236 to which reference is made for a full explanation of this mechanism, the principal operating parts of which are shown in Fig. 5 herein.

The parachute canopy 30 is fitted with a reinforcement member 31 at its center forming an orifice through which the shrouds 32 are looped at their upper ends. The lower ends of the shrouds are gathered in two groups and are attached to the harness 33 by means of lift webs or straps in the usual manner. The looped portions 34 of the shrouds pass through a ring 35, which in turn may be detachably connected to the head 21 as by being hooked up into the pelican hook 36, which in turn is pivoted to the lower end of an automatic releasing device mounted on the hoisting head. This releasing device comprises a stem 37, provided with a tapered head 38 for engaging between the adjacent jaws of two oppositely disposed sliding grippers 39 on the hoisting head. These grippers are normally held in engagement with the under side of the head 38 by means of tension springs 40. A pair of pivoted cam face members 41 operate to force the grippers 39 apart to disengage the parachute when the hoisting head reaches the upper limit of its movement and engages the limit stop 42 on the under side of the boom. A spring 43 is carried by the lifting head 40 to cushion its engagement with the limit stop. A keeper 45 is pivoted to the stem 37 to retain the pelican hook in closed position until released by pulling the trip cord 46.

To each of the shrouds 32 is secured a ring 51 near the lower edge of the parachute canopy, and these rings hook over detents 52 pivoted beneath the outer edge of the spreading ring 23, as shown in Figs. 3 and 4, in normal position of the apparatus for elevating the parachute. These detents are hinged to brackets 53 at points spaced below the under side of the spreading ring sufficiently for the rings 51 to lie against the spreading ring at a level above the pivot points of the detents, and thereby tend to hold the detents in their upper position with the inner fingers 54 against the outer edge of the spreading ring, as shown in Figs. 3 and 4, so long as the hoisting head puts any strain on the shrouds; but when the shrouds are released from the hoisting head and the parachute and harness start to drop, the shrouds will slacken above the ring 23 and permit the parachute to fill out. The weight of the jumper and harness thereupon will pull the rings 51 down, and when these rings drop below the pivot points of the detents, the detents will be pulled down also and will tilt outwardly and downwardly and disengage the rings, thereby completely freeing the parachute from the spreading ring 23. The bridles 26 support the ring 23 when the shrouds are released.

So long as the parachute is hooked to the spreading ring 23 it is prevented from collapsing either from the weight of the jumper or from lateral wind pressure or eddy currents if the air is not calm, and the parachute cannot disengage itself from the spreading ring until it is released from the hook at the peak and it is free to descend fully spread as it should normally under the influence of gravity, thus insuring the safety of the jumper at all heights above the ground in case of accidental release of the parachute.

The cable 13 and drum 15 may be fitted with the usual trip or safety device to prevent overwinding by stopping the motor and applying a brake; but in case the ground attendant permits the parachute to be elevated until the lifting head engages the limit stop 42, the automatic release will function to spread the grippers 39 and release the stem 37 with the pelican hook and suspended canopy, permitting the latter to free itself from the ring 23 and descend in the normal way, and preventing interference with the normal descent of the device that might otherwise be caused by any part of the hoisting apparatus should it jam or break due to overhoisting.

In the normal operation of the apparatus for training purposes, the jumper dons the harness and is hoisted to a position as near the top of the tower as is desired, at which point the hoisting apparatus is stopped and the drum locked by the brake under the control of the attendant. The jumper can then release the parachute at will by pulling the rip cord and tripping the pelican hook, the rip cord freeing itself from the keeper 45 and remaining in his hand when the pelican hook is tripped and falling with the chute as in the normal operation of a collapsible parachute of the conventional pack type.

Obviously, the tower may be provided with oppositely disposed booms and duplicate hoisting apparatus instead of the rotating platform illustrated, for enabling the descent to be made from the leeward side of the tower when the wind is strong enough to cause danger of the parachute fouling the tower in its descent.

An important advantage of the invention is the facility and safety with which by its use those desiring or required to undergo instruction in parachute jumping may familiarize themselves with different air conditions and their effects upon the behavior of a parachute, by simulating the actual conditions of a free drop while surrounded with adequate safety devices for preventing accidents.

The apparatus may be readily arranged for operation as an amusement device to provide a free drop for passengers suspended from the canopy by removing the trip cord and locking the keeper 45 in position to retain the pelican hook closed at all times, and setting the automatic releasing device to operate near the top of the ascent before the overwinding safety trip comes into operation, thus maintaining the operation of the apparatus under the control of the ground attendant.

Thus the apparatus lends itself to training and amusement purposes under adequate safeguards for the protection of those using it under all conditions of wind and weather.

The invention is not restricted to the exact construction shown in the drawings, but I claim the following:

1. A parachute device including a canopy, a carrier having a lifting means attached thereto, detachable means for laterally extending the skirt of the canopy, and means attached to the peak and the skirt of the canopy to suspend the canopy from said carrier and to extend the canopy completely vertically while it is being lifted.

2. A parachute device including a tower provided with a rotatable arm, a hoisting cable extending from the arm, a parachute canopy, a rigid ring for holding the skirt of the canopy extended, said ring being loosely attached to the cable, means for detachably engaging the peak of the canopy with the cable and means for detachably engaging the skirt of the canopy to the ring.

3. A parachute device including a tower provided with a rotatable arm, a hoisting cable extending from the arm, a parachute canopy, a rigid ring for holding the skirt of the canopy extended, said ring being loosely attached to the cable, means for detachably engaging the peak of the canopy with the cable and means for detachably engaging the skirt of the canopy with the ring, said last named means constituting a support for the ring while so engaged.

4. A parachute device including a tower provided with a rotatable arm, a hoisting cable extending from said arm, a parachute canopy releasably attached to the cable, means for maintaining the skirt of the canopy open, means on the canopy engageable with said last mentioned means and releasable therefrom except when the canopy is attached to the cable, and means for releasing the canopy from the cable to permit it to descend freely.

5. A parachute device including a parachute canopy, a spreader ring for maintaining the skirt of the canopy open, means for elevating the canopy and spreader ring which includes a tower providing a rotatable support and a cable extending therefrom, releasable means for attaching the cable to the peak of the canopy, and a series of releasable members on the skirt spreader ring and a corresponding series of engageable members on the skirt of the canopy for releasing the latter from the ring in its descent.

6. A parachute device including a carrier, a parachute canopy, and means for detachably securing the canopy to the carrier, a ring for maintaining the skirt of the canopy open, means for elevating the canopy and carrier which includes a tower providing a rotatable support and a cable extending therefrom, means for attaching the cable to the peak of the canopy and through the skirt of the canopy to the ring to support the latter, means for automatically disengaging the peak and the skirt of the canopy from the cable and ring, and means for supporting the ring from the carrier when disengaged from the skirt of the canopy.

7. A parachute jumping instruction device including a parachute canopy having a harness depending therefrom, a canopy spreading means and retaining means carried by the lower margin of the canopy for engaging the same, means connected to the apex of the canopy and to said canopy spreading means for hoisting said spreading means and canopy, said hoisting means having a separable device the separation of which permits the release of said canopy and retaining means from said spreading means to permit said canopy to drop unencumbered.

8. A hoisting and releasing device for a parachute dropping apparatus comprising a head adapted to be raised from the ground, releasable means for securing the peak of a parachute canopy to the head, means permanently attached to the head for distending the skirt of the canopy, said distending means including a rigid ring having a series of hook members mounted upon its lower face and adapted to releasably engage said skirt.

9. A hoisting and releasing device for a parachute dropping apparatus comprising a head adapted to be raised from the ground, releasable means for securing the peak of a parachute canopy to the head, means permanently attached to the head for distending the skirt of the canopy, said distending means including a rigid ring having a series of hook members pivotally mounted upon its lower face to swing down when subjected to a downward pull to release said skirt.

10. A hoisting and releasing device for a parachute dropping apparatus comprising a head adapted to be raised from the ground, releasable means for securing the peak of a parachute canopy to the head, means permanently attached to the head for distending the skirt of the canopy, said distending means including a rigid ring having a series of movable members mounted upon its lower face to engage the skirt when the peak is held up and to disengage the skirt when the peak is dropped.

11. A hoisting and releasing device for a parachute dropping apparatus comprising a head adapted to be raised from the ground, releasable means for securing the peak of a parachute canopy to the head, means permanently attached to the head for distending the skirt of the canopy, said distending means including a rigid ring having a series of hook members pivotally mounted upon the outer edge of its lower face to swing down when subjected to a downward pull and provided with fingers engaging the outer edge of said ring to hold said hook members up when subjected to inward radial pull.

12. A parachute device including a parachute canopy, a rigid ring, means for releasably attaching the skirt of the canopy to the rigid ring, means attached to said ring and canopy for raising the ring and canopy together, and means for releasing the canopy from the raising means and from the ring in succession.

13. A parachute device including a parachute canopy, a rigid ring, means attached to the peak of the canopy for raising the canopy, automatically releasable means for attaching the skirt of the canopy to the ring, means for raising the ring, means for simultaneously actuating both of said raising means, and means for releasing the canopy from its raising means.

14. A parachute device including a parachute canopy, shroud lines, a rigid ring, means for detachably connecting the skirt of the canopy to the ring, means attached to the peak of the canopy for raising the canopy, means attached to the ring for raising the same, means for simultaneously operating both of said raising means, and means for releasing the canopy from its raising means whereby when a downward force is applied to the shroud lines and the peak of the canopy is released the canopy will be automatically released from the ring.

15. A parachute device including a rigid ring, a parachute canopy, a carrier attached to the canopy, means for detachably connecting the skirt of the canopy under lateral tension to the ring, the lateral tension of the skirt of the canopy operating to maintain the attaching means operative, releasable means attached to the peak of the canopy to raise the same, means for raising the ring, means for releasing the peak of the canopy from its raising means to permit a downward force to be applied to the canopy to overcome the aforesaid lateral tension whereby the canopy is released from the ring.

16. In a parachute device a rigid ring, a parachute canopy, hooks on the rigid ring to detachably engage the skirt of the canopy, a hoisting cable, means for detachably attaching the peak of the canopy to the cable, means for attaching the ring to the cable and means for releasing the peak of the canopy from the cable, said last mentioned means including provision for manual operation.

17. In a parachute device a rigid ring, a parachute canopy, means on the rigid ring to detachably engage the skirt of the canopy, a hoisting cable, means for detachably attaching the peak of the canopy to the cable, means for attaching the ring to the cable and means for releasing the peak of the canopy from the cable, said last mentioned means including provision for both automatic and manual operation.

18. In a parachute device a rigid ring, a parachute canopy, means on the rigid ring to detachably engage the skirt of the canopy, a hoisting cable, means for detachably attaching the peak of the canopy to the cable, means for attaching the ring to the cable and automatic means for releasing the peak of the canopy from the cable operable at a predetermined point in the hoisting thereof, said last mentioned means including provision for manual operation independently of the hoisting of said cable.

19. A device for lifting and launching a parachute for a free descent comprising a hoisting cable, a parachute canopy detachably secured to said cable at its peak, a rigid ring secured to said cable for extending the skirt of said canopy laterally, releasable means for securing the skirt of said canopy to said ring, and means for preventing release of said skirt from said ring while said canopy is supported at its peak.

20. A device for lifting and launching a parachute for a free descent comprising a hoisting cable, a parachute canopy detachably secured to said cable at its peak, a rigid ring secured to said cable for extending the skirt of said canopy laterally, releasable means for securing the skirt of said canopy to said ring, said means operating to support said ring while said canopy is supported at its peak by said cable, and means for preventing release of said skirt from said ring while said canopy is supported at its peak.

JAMES H. STRONG.